(12) United States Patent
Lin et al.

(10) Patent No.: US 8,079,844 B2
(45) Date of Patent: Dec. 20, 2011

(54) MOLDING MACHINE

(75) Inventors: Ping-Jung Lin, Tainan County (TW); Po-Hung Lin, Yongkang (TW); Po-Hang Lin, Yongkang (TW)

(73) Assignee: Jih Huang Machinery Industrial Co. Ltd., Yongkang (TW)

( * ) Notice: Subject to any disclaimer, the term of this patent is extended or adjusted under 35 U.S.C. 154(b) by 205 days.

(21) Appl. No.: 12/688,315

(22) Filed: Jan. 15, 2010

(65) Prior Publication Data

US 2011/0177192 A1 Jul. 21, 2011

(51) Int. Cl.
B29C 33/22 (2006.01)
(52) U.S. Cl. ........... 425/451.5; 425/541; 425/592
(58) Field of Classification Search ........... 425/451.5, 425/541, 592
See application file for complete search history.

(56) References Cited

U.S. PATENT DOCUMENTS

| 2,975,473 | A | * | 3/1961 | Hagen et al. | 425/541 |
| 5,720,918 | A | * | 2/1998 | Wollschlager et al. | 425/451.9 |
| 6,224,367 | B1 | * | 5/2001 | Maier | 425/451.6 |
| 6,837,699 | B2 | * | 1/2005 | Jandura | 425/451.5 |
| 7,364,422 | B2 | * | 4/2008 | Canossi | 425/451.6 |

* cited by examiner

Primary Examiner — Richard Crispino
Assistant Examiner — Thukhanh Nguyen

(57) ABSTRACT

A molding machine includes two holding arms mounted on a base unit, connected respectively to two molds, and operable to move the molds between a mold closing state and a mold opened state. The molding machine further includes an adjusting seat mounted on the base unit and movable relative to a threaded shaft that is rotated by a power supply, a swing arm connected pivotally to the adjusting seat, a linkage unit having opposite end parts that are connected pivotally and respectively to a pivot portion of the swing arm and one of the holding arms, and another linkage unit having opposite end parts that are connected pivotally and respectively to another pivot portion of the swing arm and the other one of the holding arms. The swing arm is swingable through the movement of the adjusting seat so as to swing the holding arms by virtue of the linkage units.

6 Claims, 4 Drawing Sheets

MOLDING MACHINE

BACKGROUND OF THE INVENTION

1. Field of the Invention

The invention relates to a molding machine, for molding products, such as containers.

2. Description of the Related Art

Japanese Patent No. P2004-255598A discloses conventional molding machine that includes a stationary mold and a movable mold. The movable mold is operable to move close to or away from the stationary mold for molding containers. However, when the movable mold is moved to couple with the stationary mold, the stationary mold is pushed by the momentum of the movable mold, and may be slightly moved from its normal position instead of being stationary relative to the movable mold. Therefore, the conventional molding machine is not capable of molding the containers precisely.

SUMMARY OF THE INVENTION

Therefore, the object of the present invention is to provide a molding machine that includes molds operable to move close to or away from each other, and that is able to mold containers precisely.

Accordingly, a molding machine of the present invention comprises a base unit, left and right molds disposed on the base unit, and left and right holding arms mounted on the base unit in a spaced-apart relationship and connected respectively to the left and right molds. The left and right holding arms are operable to move the left and right molds between a mold closing state, where the left and right molds couple with each other, and a mold opened state, where the left and right molds are far away from each other. The molding machine further comprises a power supply mounted to the base unit, a threaded shaft rotated by the power supply, an adjusting seat, a pivot plate, a swing arm, and left and right linkage units. The adjusting seat is mounted on the base unit, is connected drivenly to the threaded shaft to move in a left-right direction relative to the threaded shaft, and has a pivot portion. The pivot plate has a first end portion that is connected pivotally to the pivot portion of the adjusting seat, and a second end portion that is opposite to the first end portion. The swing arm has a first pivot portion that is connected pivotally to the second end portion of the pivot plate, and a second pivot portion that is opposite to the first pivot portion. The left linkage unit has opposite end parts that are connected pivotally and respectively to the first pivot portion of the swing arm and the left holding arm. The right linkage unit has opposite end parts that are connected pivotally and respectively to the second pivot portion of the swing arm and the right holding arm. The swing arm is swingable through the movement of the adjusting seat so as to swing the left and right holding arms by virtue of the left and right linkage units.

DETAILED DESCRIPTION OF THE PREFERRED EMBODIMENT

Figure 1:
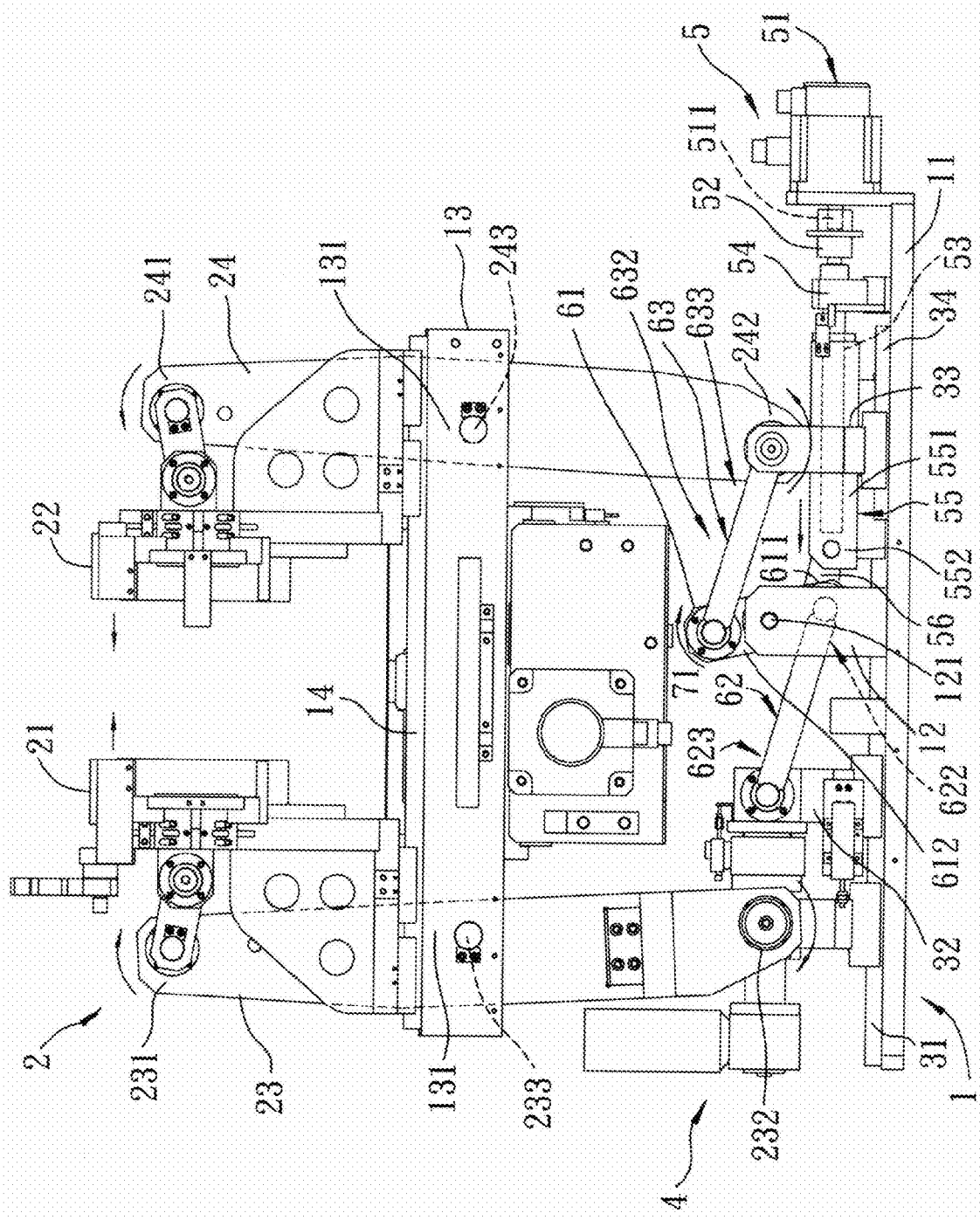
FIG. 1 is a front view of a preferred embodiment of a molding machine according to the invention, illustrating left and right molds in a mold opened state.
Figure 2:
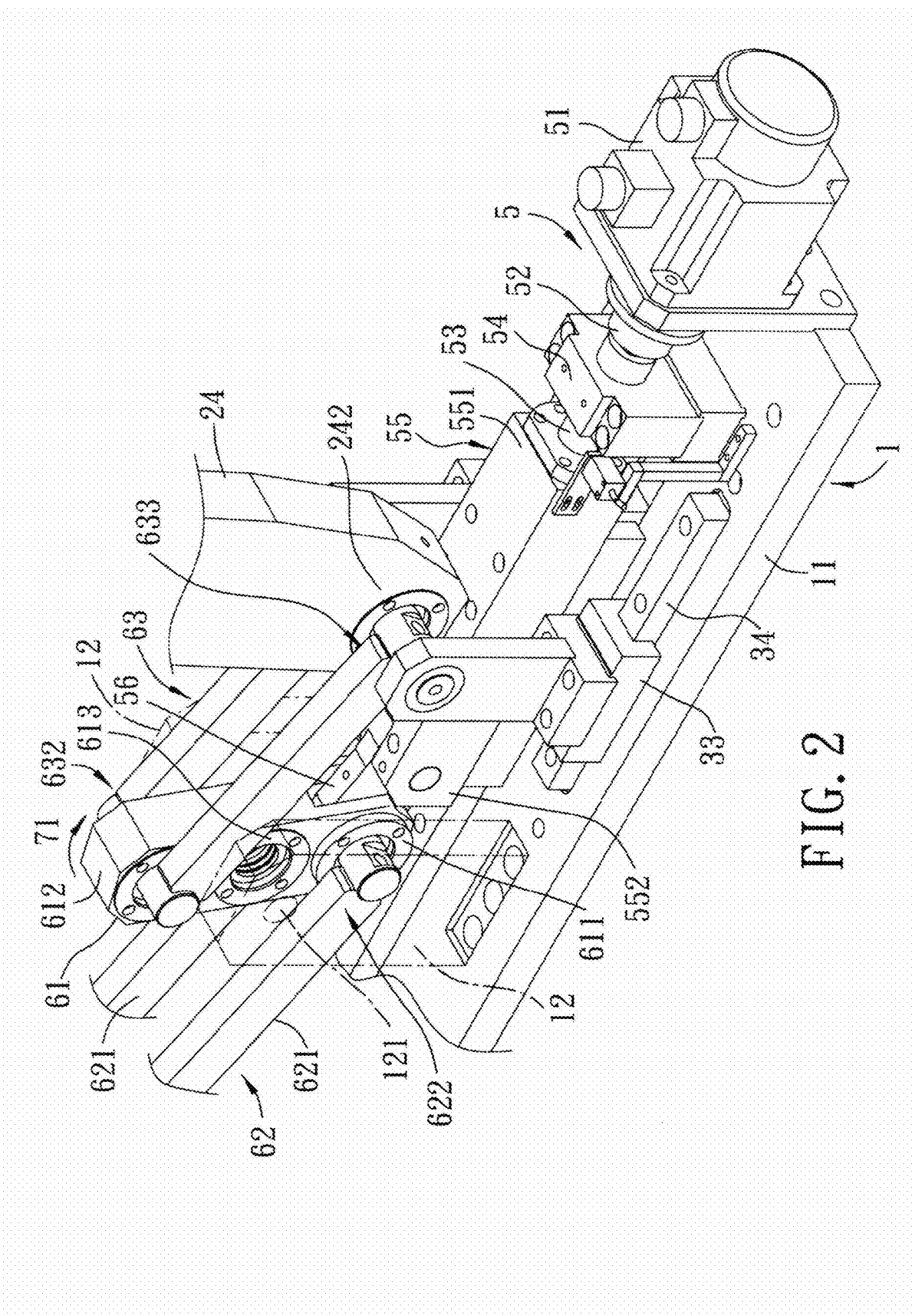
FIG. 2 is a fragmentary assembled perspective view of the preferred embodiment.
Figure 3:
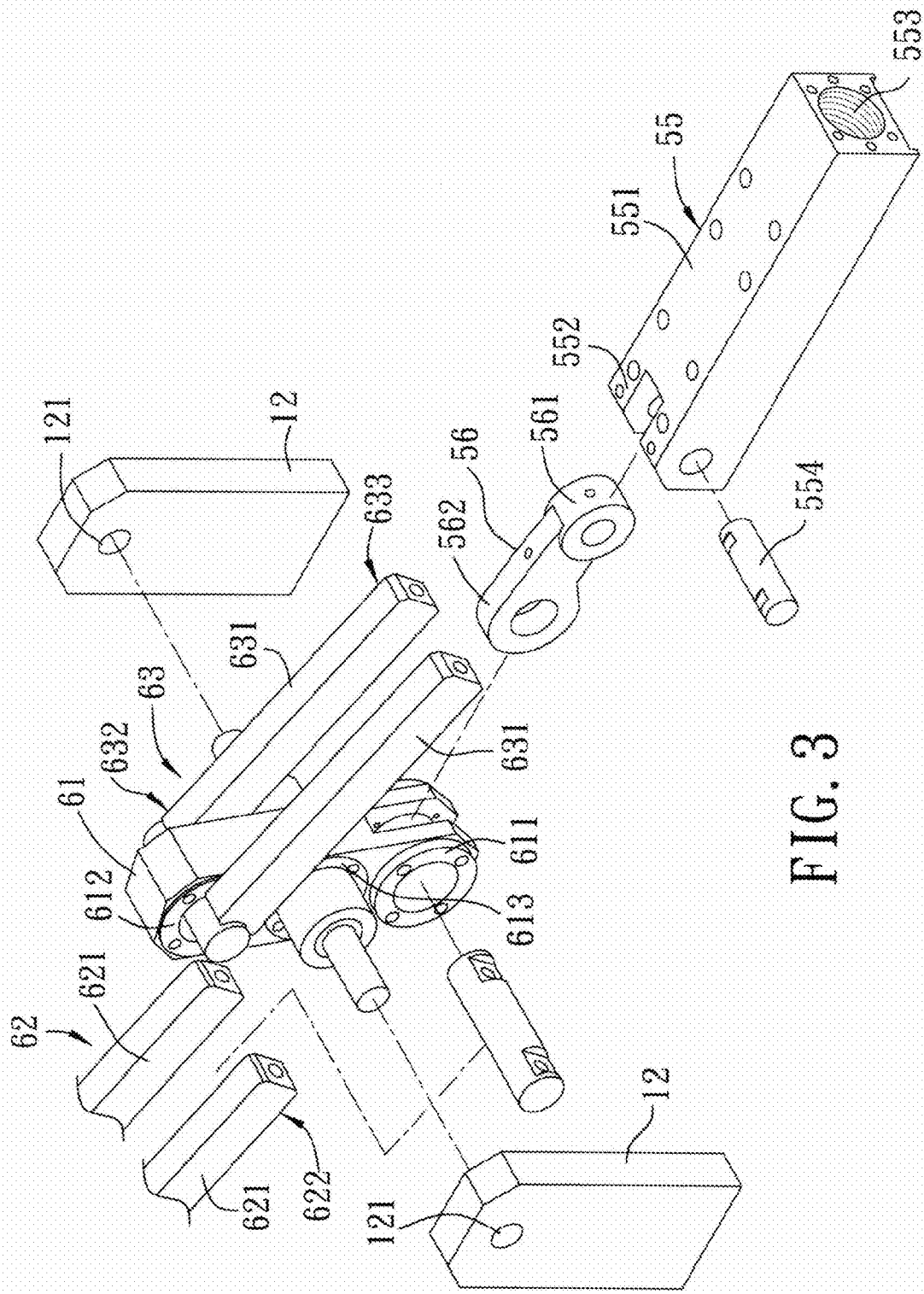
FIG. 3 is a fragmentary exploded perspective view of the preferred embodiment.

As shown in FIGS. 1 to 3, the preferred embodiment of a molding machine according to the present invention comprises a base unit 1, left and right molds 21, 22, and left and right holding arms 23, 24.

The base unit 1 includes a base seat 11, a pair of mounting parts 12 mounted on the base seat 11 and spaced apart from each other in a front-rear direction, a mold-mounting seat 13 disposed over the base seat 11, and a plurality of mold-engaging rails 14 mounted on the mold-mounting seat 13, extends in the left-right direction, and spaced-apart from each other in the front-rear direction (only one is visible in FIG. 1). Each of the mounting parts 12 has a coupling section 121. The mold-mounting seat 13 has left and right pivot mounts 131 that are spaced-apart from each other in a left-right direction.

The left and right molds 21, 22 are disposed on the base unit 1, and engage and movable along the mold-engaging rails 14.

Figure 4:
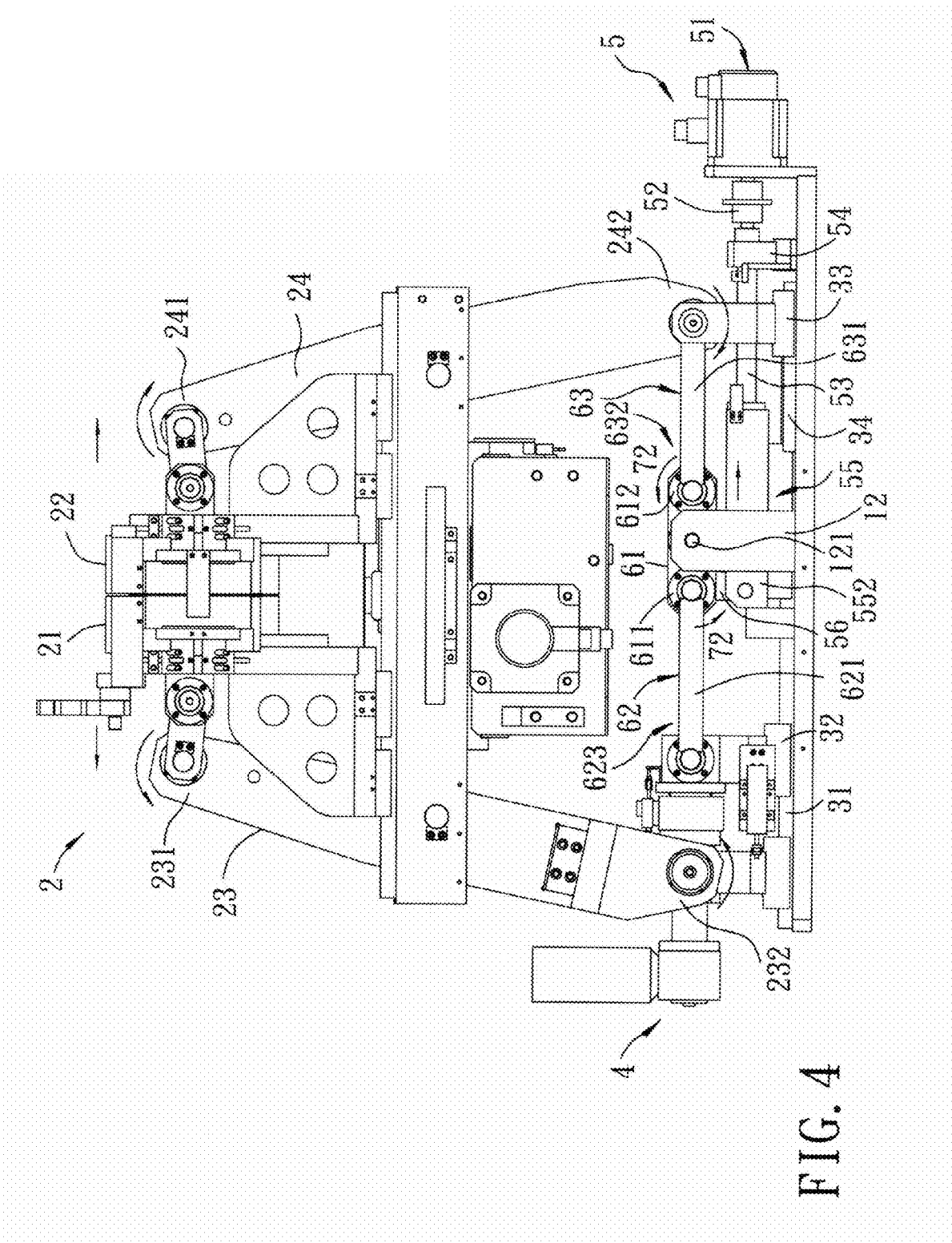
FIG. 4 is a view similar to FIG. 1, but illustrating the left and right molds in a mold closing state.

The left and right holding arms 23, 24 are mounted on the base unit 1 in a spaced-apart relationship and are connected respectively to the left and right molds 21, 22. Each of the left and right holding arms 23, 24 has a mold-connecting part 231, 241 that is connected to a corresponding one of the left and right molds 21, 22, a driven part 232, 242 that is opposite to the mold-connecting part 231, 241, and a fulcrumed point 233, 243 that is disposed between the mold-connecting part 231, 241 and the driven part 232, 242. The pivot mounts 131 of the mold-mounting seat 13 are connected pivotally and respectively to the fulcrumed points 233, 243 of the left and right holding arms 23, 24. The left and right holding arms 23, 24 are operable to move the left and right molds 21, 22 between a mold-closing state (see FIG. 4), where the left and right molds couple with each other, and a mold opened state (see FIG. 1), where the left and right molds 21, 22 are far away from each other.

The molding machine of this invention further comprises left and right slide rails 31, 34, left and right slides 32, 33, a power unit 5, a swing arm 61, and left and right linkage units 62, 63.

The left and right slide rails 31, 34 are mounted on the base seat 11 of the base unit 1, extend in the left-right direction, and are spaced apart from each other in the front-rear direction. The left slide 32 is disposed on the base seat 11, is mounted on and slidable in the left-right direction relative to the left slide rail 31, and has a left end connected pivotally to the driven part 232 of the left holding arm 23. The right slide 33 is disposed on the base seat 11, is mounted on and slidable in the left-right direction relative to the right slide rail 34, and is connected pivotally to the driven part 242 of the right holding arm 24.

The power unit 5 includes a power supply 51, a coupling 52, a threaded shaft 53, a stationary seat 54, an adjusting seat 55, and a pivot plate 56.

In this embodiment, the power supply 51 is a servo motor that is controlled electrically by a digital control system, and is mounted to the base seat 11. The coupling interconnects a power shaft 511 of the power supply 51 and the threaded shaft 53, so that the threaded shaft 53 can be rotated by the power supply 51. The threaded shaft 53 is a ball screw shaft, and extends in the left-right direction from the coupling 52 into the adjusting seat 55 through the stationary seat 54. The adjusting seat 55 is mounted slidably on the base seat 11, and has a hollow rectangular seat body 551 extending in the left-right direction, and defining a cylindrical hole therein. The threaded shaft 53 extends drivenly into the cylindrical hole of the adjusting seat 55, so that the adjusting seat 55 can be moved in the left-right direction relative to the threaded shaft 53. The seat body 551 has a pivot part 552 that is distal from the power supply 51 and that is configured as a notch with a pivot pin extending transversely in the front-rear direction through the notch. The pivot plate 56 has a first end portion 561 that is connected pivotally to the pivot part 552 of the seat body 551 of the adjusting seat 55, and a second end portion 562 that is opposite to the first end portion 561.

The swing arm 61 has a first pivot portion 611 that is connected pivotally to the second end portion 562 of the pivot plate 56, a second pivot portion 612 that is opposite to the first pivot portion 611. The swing arm 61 further has a fulcrumed portion 613 disposed between the first and second pivot portions 611, 612, and is fulcrumed between the coupling sections 121 of the mounting part 12 of the base unit 1, so that the swing arm 61 is pivotable about a fulcrumed point of the fulcrumed portion 613.

The first linkage unit 62 consists of a pair of parallel left linkage rods 621, and has opposite end parts 622, 623 that are connected pivotally and respectively to the first pivot portion 611 of the swing arm 61 and a right end of the left slide 32 (i.e., the end part 623 is connected pivotally to the driven part 232 of the left holding arm 23).

The right linkage unit 63 consists of a pair of parallel right linkage rods 631, and has opposite end parts 632, 633. The end part 632 is connected to the second pivot portion 612 of the swing arm 62, and the other end part 633 is connected pivotally to the driven part 242 of the right holding arm 24 and the right slide 33. Therefore, the swing arm 61 is swingable through the movement of the adjusting seat 55 so as to swing the left and right holding arms 23, 24 by virtue of the left and right linkage units 62, 63. It should be noted that, the structural connection among the left holding arm 23, the left slide 32, and the left linkage unit 62 may be arranged as that among the right holding arm 24, the right slide 33, and the right linkage unit 63 in other embodiments of the invention.

The molding machine of the invention further comprises a mold thick adjusting unit 4 that is disposed for adjusting thickness of the mold that is defined cooperatively by the left and right molds 21, 22. Since the feature of this invention does not reside in the specific configuration of the mold thick adjusting unit 4, which are known in the art, further details of the same are omitted herein for the sake of brevity.

Referring back to FIG. 1, when the left and right molds 21, 22 are in the mold closing state, the swing arm 61 is in an inclined state with the first pivot portion 611 being disposed below the second pivot portion 612, and each of the left and right linkage units 62, 63 is in an inclined state with the end parts 622, 633 being disposed respectively below the end parts 623, 632.

When the threaded shaft 53 is rotated by the power supply 51 to drive the adjusting seat 55 and the pivot plate 56 to move away from the power supply 51, the swing arm 61 is driven to pivot in a first pivoting direction 71 (see FIG. 1) and push the left and right linkage units 62, 63 away from each other, thereby driving the left and right slides 32, 33 to slide respectively on the left and right slide rails 31, 34 away from each other. Such movement of the left and right slides 32, 33 also moves the driven parts 232, 242 of the left and right holding arms 23, 24 away from each other so that the mold-connecting parts 231, 241 of the left and right holding arms 23, 24 are moved toward each other, thereby moving the left and right molds 21, 22 to the mold closing state. At this time, the swing arm 61 is held in a horizontal state with the first and second pivot portions 611, 612 being disposed respectively at the left and right sides of the coupling sections 121 of the mounting parts 12. Also, the left and right linkage rods 621, 631 are held in a horizontal state.

When the threaded shaft 53 is rotated reversely by the power supply 51 to drive the adjusting seat 55 and the pivot plate 56 to move toward the power supply 51, the swing arm 61 is driven to pivot in a second pivoting direction 72 (see FIG. 4) opposite to the first pivoting direction 71 and push the left and right linkage units 62, 63 toward each other, thereby driving the left and right slides 32, 33 to slide respectively on the left and right slide rails 31, 34 toward each other. Such movement of the left and right slides 32, 33 also moves the driven parts 232, 242 of the left and right holding arms 23, 24 toward each other so that the mold-connecting parts 231, 241 of the left and right holding arms 23, 24 are moved away from each other, thereby moving the left and right molds 21, 22 back to the mold opened state.

Therefore, by virtue of the configuration of the left and right linkage units 62, 63, the left and right holds 21, 22 can be synchronously movable toward each other, and push each other with forces in the same magnitude when at the mold-closing state, so that the molding operation can be performed precisely.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A molding machine comprising:
   a base unit;
   left and right molds disposed on said base unit;
   left and right holding arms mounted on said base unit in a spaced-apart relationship and connected respectively to said left and right molds;
   wherein said left and right holding arms are operable to move said left and right molds between a mold closing state, where said left and right molds move couple with each other, and a mold opened state, where said left and right molds are far away from each other;
   a power supply mounted to said base unit;
   a threaded shaft rotated by said power supply;
   an adjusting seat mounted on said base unit, connected drivenly to said threaded shaft to move in a left-right direction relative to said threaded shaft, and having a pivot part;
   a pivot plate having a first end portion that is connected pivotally to said pivot part of said adjusting seat, and a second end portion that is opposite to said first end portion;
   a swing arm having a first pivot portion that is connected pivotally to said second end portion of said pivot plate, and a second pivot portion that is opposite to said first pivot portion;
   a left linkage unit having opposite end parts that are connected pivotally and respectively to said first pivot portion of said swing arm and said left holding arm; and
   a right linkage unit having opposite end parts that are connected pivotally and respectively to said second pivot portion of said swing arm and said right holding arm;
   wherein said swing arm is swingable through the movement of said adjusting seat so as to swing said left and right holding arms by virtue of said left and right linkage units.

2. The molding machine as claimed in claim 1, wherein:

said swing arm further has a fulcrumed portion disposed between said first and second pivot portions, and is pivotable about a fulcrumed point of said fulcrumed portion;

each of said left and right holding arms has a mold-connecting part connected to a corresponding one of said left and right molds, a driven part opposite to said mold-connecting part and connected pivotally to a corresponding one of said end parts of said left and right linkage units, and a fulcrumed point disposed between said mold-connecting part and said driven part;

when said swing arm pulls said left and right linkage units toward each other, said driven parts of said left and right holding arms are moved toward each other so that said mold-connecting parts of said left and right holding arms are moved away from each other, thereby moving said left and right molds to the mold opened state; and when said swing arm pushes said left and right linkage units away from each other, said driven parts of said left and right holding arms are moved away from each other so that said mold-connecting parts of said left and right holding arms are moved toward each other, thereby moving said left and right molds to the mold closing state.

3. The molding machine as claimed in claim 2, further comprising:

a left slide that is disposed on said base unit, that is movable in the left-right direction, and that is connected pivotally to said driven part of said left holding arm and said left linkage unit; and a right slide that is disposed on said base unit, that is movable in the left-right direction, and that is connected pivotally to said driven part of said right holding arm and said left linkage unit.

4. The molding machine as claimed in claim 3, further comprising left and right slide rails mounted on said base unit, said left and right slides being mounted slidably and respectively on said left and right slide rails.

5. The molding machine as claimed in claim 2, wherein said base unit includes a base seat, and a pair of mounting parts that are mounted on said base seat and that are spaced apart from each other in the front-rear direction, each of said mounting parts has a coupling section, said fulcrumed portion of said swing arm being fulcrumed between said coupling sections of said mounting parts.

6. The molding machine as claimed in claim 5, wherein said base unit further includes a mold-mounting seat disposed over said base seat, and having left and right pivot mounts that are spaced apart from each other in the left-right direction, and that are connected respectively to said fulcrumed points of said left and right holding arms.

* * * * *